United States Patent

Park et al.

[11] Patent Number: 5,941,163
[45] Date of Patent: Aug. 24, 1999

[54] BREWED COFFEE VENDING MACHINE

[75] Inventors: Young-Gon Park, Yusoo; Tae-Ho Kang; Dong-Sik Oh, both of Kwangju, all of Rep. of Korea

[73] Assignee: Kwangju Electronics Co., Ltd, Kwangju, Rep. of Korea

[21] Appl. No.: 08/840,156

[22] Filed: Apr. 11, 1997

[30] Foreign Application Priority Data

| Apr. 13, 1996 | [KR] | Rep. of Korea | 96-7993 |
| Apr. 13, 1996 | [KR] | Rep. of Korea | 96-7994 |
| Apr. 13, 1996 | [KR] | Rep. of Korea | 96-7995 |
| Apr. 13, 1996 | [KR] | Rep. of Korea | 96-7996 |
| Apr. 13, 1996 | [KR] | Rep. of Korea | 96-7997 |

[51] Int. Cl.⁶ .............................. A47J 31/24; G07F 13/06
[52] U.S. Cl. .......................... 99/286; 99/287; 99/289 R; 99/290
[58] Field of Search .............................. 99/286, 287, 290, 99/289 R

[56] References Cited

U.S. PATENT DOCUMENTS

| 3,171,344 | 3/1965 | Mathieu et al. | 99/289 R X |
| 3,446,137 | 5/1969 | Pryor et al. | 99/289 R |
| 4,357,861 | 11/1982 | Di Girolamo | 99/289 R X |
| 4,649,809 | 3/1987 | Kanezashi | 99/290 |
| 4,815,633 | 3/1989 | Kondo et al. | 99/286 X |

FOREIGN PATENT DOCUMENTS

| 60-25079 | 2/1985 | Japan . |
| 3-9088 | 3/1991 | Japan . |

Primary Examiner—Reginald L. Alexander
Attorney, Agent, or Firm—Staas & Halsey

[57] ABSTRACT

A brewed coffee vending machine with a coffee reheating device is disclosed. The brewed coffee vending machine includes a ground coffee bean receptacle, a hot water container, a brewing unit, an extractor, and a coffee reheating device that reheats the brewed coffee extracted by the extractor before it is dispensed to the consumer. The coffee reheating device comprises a case in which an electric heating line is embedded; a heating chamber installed inside the case; an intake nozzle installed on one side of the case through which the brewed coffee enters the heating chamber; and an outlet installed on another side of the case through which the reheated coffee exits the coffee reheating device.

7 Claims, 4 Drawing Sheets

BREWED COFFEE VENDING MACHINE

BACKGROUND OF THE INVENTION

1. Field of the Invention

The present invention relates to a brewed coffee vending machine. More particularly, it relates to a brewed coffee vending machine which includes a coffee reheating device that serves to reheat coffee procured by an extractor immediately before it is dispensed to consumers, thereby ensuring that the coffee will be at a pleasurable temperature.

2. Description of the Prior Art

A vending machine generally holds packs of cigarettes, containers of coffee, tea and other soft drinks which consumers can purchase and receive automatically. As shown in FIG. 4, which depicts the overall interior construction of a brewed coffee vending machine, the brewed coffee vending machine includes a cabinet 10 which constitutes the outer appearance of the vending machine, a ground coffee bean receptacle 20 that holds ground coffee beans, and an extractor 30 that is installed under the ground coffee bean receptacle 20 to extract coffee by jetting pressurized air into the mixture of the ground coffee beans and hot water, after which the coffee is moved to a mixing container 12.

The extractor 30 includes a brewing unit 22 which mixes the ground coffee beans with hot water, a filtering mechanism (not illustrated) that filters out the coffee grounds, and a pressure device (not illustrated) which furnishes pressurized air required for the filtering process. The brewed coffee vending machine also includes flavoring material receptacles 11 that are installed on one side of the cabinet 10's interior, respectively holding sugar, cream and specially-treated dried leaves for making tea, and the mixing container 12, which is installed under the flavoring material receptacles 11, in which flavoring materials are mixed with hot water. The extractor 30 is connected with the mixing container 12 by a coffee conduit 40, and the mixing container 12 is connected to a drink supply conduit 41 through which a newly made drink is supplied to a cup dispenser 13.

The following description relates to the operation of the conventional brewed coffee vending machine.

When brewed coffee is selected from a control panel on the vending machine by a consumer, a set amount of ground coffee beans from the ground coffee bean receptacle 20 and hot water from the hot water container 21 are poured into the brewing unit 22, in which the two are mixed.

Next, the mixture of ground coffee beans and hot water is supplied to the filtering mechanism (not illustrated) of the extractor 30. The pressure device (not illustrated) then applies pressure to the mixture, thereby extracting the coffee from the mixture through the filter (not illustrated). The coffee is then delivered to the mixing container 12 through the coffee supply conduit 40. In the mixing container 12 it is mixed with a given amount of sugar, cream or both, and is discharged into the cup dispenser 13 by way of the drink supply conduit 41.

Through the above procedure, the brewed coffee vending machine dispenses brewed coffee with rich taste and aroma to customers. However, the above-described steps, which are utilized by the conventional brewed coffee vending machine, do not supply adequately heated coffee to the consumer because, compared to the rapid speed at which instant coffee is dispensed, these steps proceed at slow pace which allows the coffee to cool.

SUMMARY OF THE INVENTION

The present invention is a brewed coffee vending machine that obviates the above problems and disadvantages of the conventional technique.

It is the objective of the present invention to provide a brewed coffee vending machine which includes a coffee reheating device that serves to reheat coffee immediately after it is filtered out from the coffee grounds so that it is of an adequate temperature when it is dispensed to the consumer.

In order to obtain the above-mentioned objective, there is disclosed a brewed coffee vending machine comprising: a ground coffee bean receptacle that contains ground coffee beans, a hot water container that holds hot water, a brewing unit that mixes a set amount of ground coffee beans from the ground coffee bean receptacle with hot water from the hot water container, and an extractor that extracts coffee from the mixture by jetting pressurized air into the mixture. The feature of the inventive brewed coffee vending machine is a coffee reheating device that reheats the coffee extracted by the extractor.

The coffee reheating device of the present invention includes: a case in which an electric heating line is embedded, a heating chamber installed inside the case, an intake nozzle installed on one side of the case that directs the flow of the coffee to the heating chamber, and an outlet installed on another side of the case through which the heated coffee exits the device. The intake nozzle is formed on the case's top surface so that the coffee drops into the heating chamber through the intake nozzle onto a distributing member provided on the heating chamber's bottom so as to evenly distribute the coffee over the bottom of the heating chamber.

The coffee reheating device also includes a protecting cover that encloses the case's outer surface and a thermal insulation material for covering the protecting cover. Projections are formed between the protecting cover and the case so as to hold the protecting cover a set distance from the case. One end of each of the projections is welded to the outer surface of the case, and the other has a coupling hole. The protecting cover is fastened to the case with screws that use the coupling holes and the holes formed on the protecting cover corresponding to the coupling holes of the projections.

DETAILED DESCRIPTION OF THE PREFERRED EMBODIMENTS

Preferred embodiments of the present invention will be fully described referring to the accompanying drawings.

Figure 1:
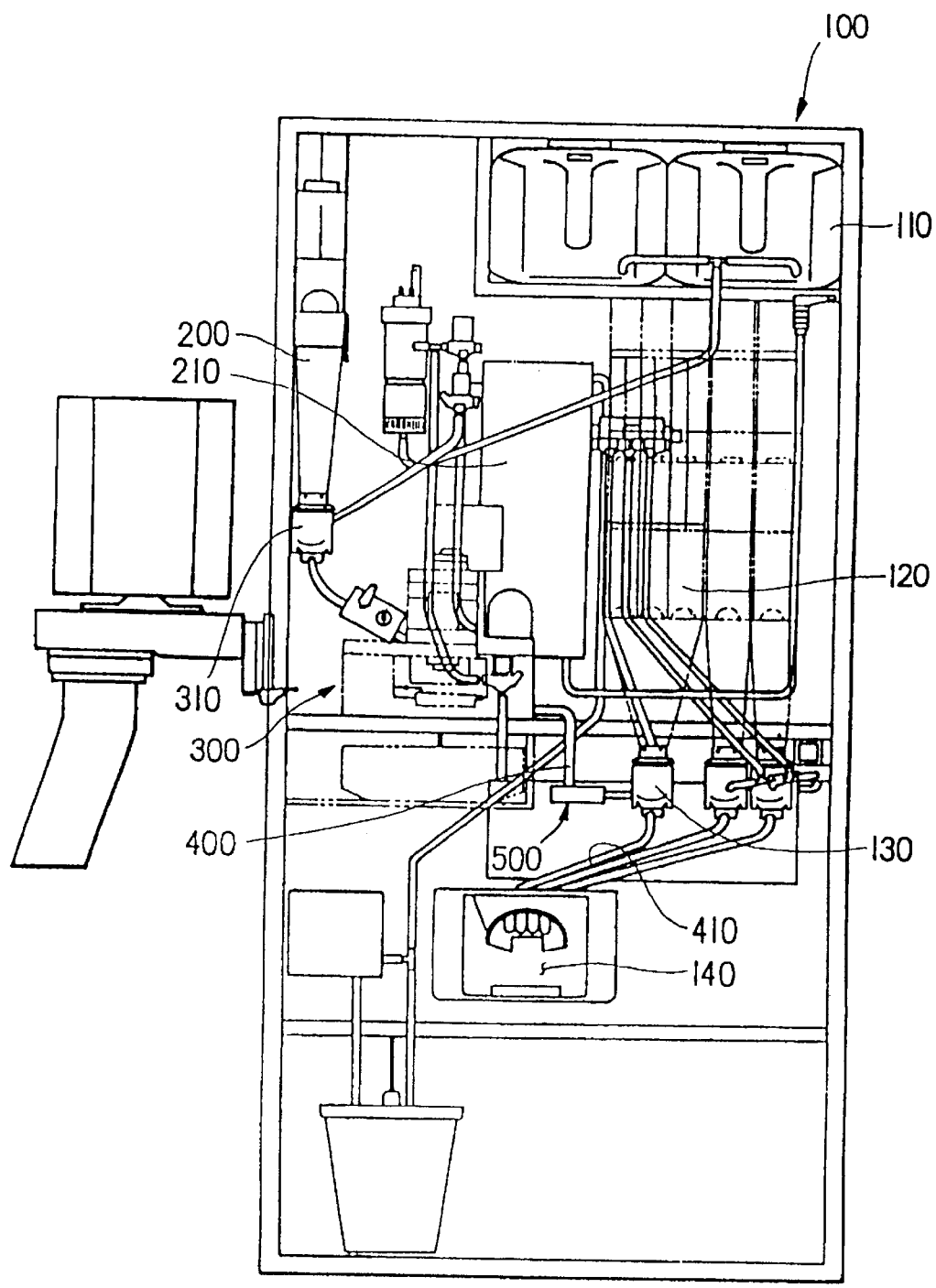
FIG. 1 schematically depicts the overall internal construction of a brewed coffee vending machine in accordance with the first preferred embodiment of the present invention.

FIG. 1 schematically depicts the overall internal construction of a brewed coffee vending machine in accordance with the first preferred embodiment of the present invention. The brewed coffee vending machine includes a cabinet 100 constituting its main body, a water container 110 installed in the upper portion of the cabinet 100's interior, and flavoring material receptacles 120 respectively holding flavoring materials such as instant coffee powder, sugar, cream and the like. Under the flavoring material receptacles 120 is a mixing container 130 in which beverages are made by reconstituting the aforementioned flavoring materials with hot water. Connected to the mixing container 130 is a drink supply conduit 410 through which reconstituted beverages are delivered to the cup dispenser 140.

The inventive brewed coffee vending machine also has a device for brewing coffee installed on one side of the cabinet's 100 interior. This device includes a ground coffee bean receptacle 200 that holds ground coffee beans, a hot-water container 210 that holds heated water from the water container 110, a brewing unit 310 that mixes the ground coffee beans with hot water, and an extractor 300 that extracts coffee from the mixture of ground coffee beans and water by jetting pressurized air into the mixture.

The extractor 300 includes a filtering mechanism (not illustrated) that filters the mixture made in the brewing unit 310 so that coffee grounds are strained out while coffee passes through the filter to the mixing container 130 through a coffee conduit 400. The step of straining out the coffee grounds is carried out by a pressure device (not illustrated) that uses pressurized air.

The mixing container 130 mixes the coffee with a set amount of sugar, cream, or both. The coffee is then output to the cup dispenser 140 through the drink supply conduit 410.

The inventive brewed coffee vending machine also has a coffee reheating device 500 which reheats the coffee passing through the drink supply conduit 410 before it is supplied to the cup dispenser 140.

Figure 2:
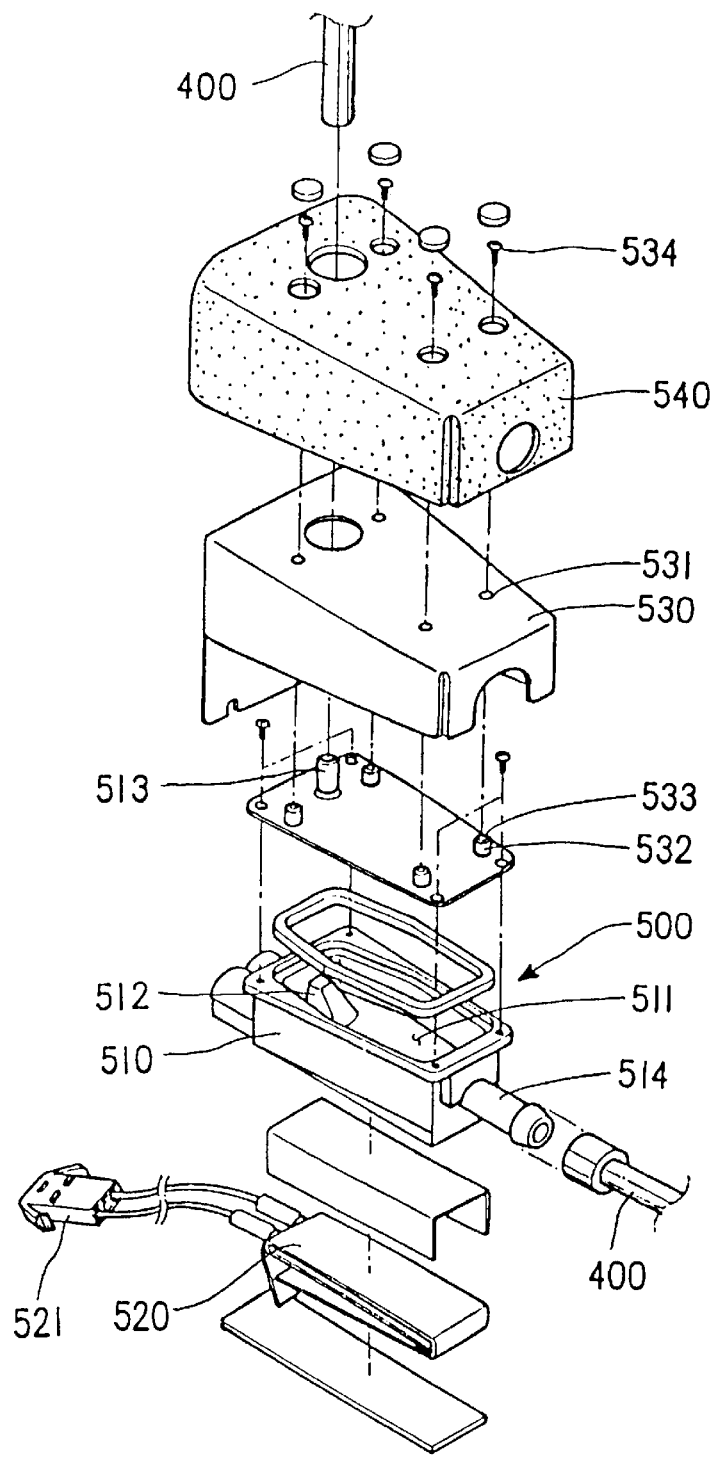
FIG. 2 is an exploded-perspective view of a coffee reheating device for the brewed coffee vending machine in accordance with the first preferred embodiment.

Referring to FIG. 2, the construction of the coffee reheating device 500 is now described in detail.

The coffee reheating device 500, as shown in FIG. 2, includes a case 510 and an electric heater line 520, which produces heat, embedded in the case 510's bottom. The case 510 has an intake nozzle 513 that is connected with the coffee conduit 400, through which the coffee is introduced to the case's 510 heating chamber 511, and an outlet 514 through which the heated coffee exits. The intake nozzle 513 is formed on the case's 510 top surface, and a distributing member 512, which helps to distribute the coffee in the heating chamber 511, is formed protruding upward from the heating chamber 511's bottom. The coffee flowing into the heating chamber 511 drops onto the distributing member 512 so as to be evenly distributed in the heating chamber 511's bottom for more efficient heating. The coffee liquid is then furnished to the mixing container 130 sequentially through the outlet 514 and coffee conduit 400.

Reference numeral 521 is an input terminal for supplying power to the electric heater line 520. Since the outer surface of the coffee reheating device's case 510 becomes very hot during operation, an operator may get burnt when cleaning the interior of the vending machine or refilling the flavoring materials. In order to prevent this, a steel protecting cover 530 and a thermal insulation material 540 are provided to enclose the case 510. The protecting cover 530 is joined to the case 510 with screws 534, and is spaced away from the case 510's outer surface so as to create an air gap therebetween that prevents heat transmission.

On the top surface of the case 510 are a plurality of projections 532 of a predetermined length that are evenly spaced from each other One end of each of the projections 532 is welded to the top surface of the case 510, and the other has a coupling hole 533. On the protecting cover 530 are holes 531 formed corresponding to the respective coupling holes 533. Each of the screws 534 passes through its respective protecting cover's 530 hole 531 and securely fits in a coupling hole 533, so that the protecting cover 530 encloses the case 510's outer surface but is spaced a short distance away from the case 510. The thermal insulation material 540 is a heat-resistant sponge and covers the protecting cover 530 for heat insulation. This prevents an operator from suffering a burn if he touches the coffee reheating device 500.

The following description relates to the operation of the brewed coffee vending machine in accordance with the present invention.

When brewed coffee is selected from a control panel on the vending machine by a consumer, a set amount of ground coffee beans from the ground coffee bean receptacle 200 and hot water from the hot water container 210 are poured into the brewing unit 310, in which the two are mixed.

Next, the mixture of the ground beans and hot water is supplied to the filtering mechanism (not illustrated) of the extractor 300. The pressure device (not illustrated) then jets pressurized air into the mixture, thereby extracting the coffee from the mixture through a filter (not illustrated), and the coffee is then delivered to the heating chamber 511 sequentially through the coffee supply conduit 400 and the intake nozzle 513.

The coffee introduced into the heating chamber 511, after being evenly distributed by splashing off the distributing member 512, flows on the hot inner bottom of the heating chamber 511 to thereby be reheated quickly, and is then supplied to the mixing container 130 through the outlet 514 and the coffee conduit 400. The coffee is then mixed with a set amount of sugar, cream, or both according to a consumer's taste, and is sent to the cup dispenser 140 by way of the drink supply conduit 410. Since the coffee supplied to the mixing container 130 is first reheated by the coffee reheating device 500, the sugar and cream are readily dissolved in the reheated coffee, and steaming brewed coffee is then dispensed via the drink supply conduit 410.

Figure 3:
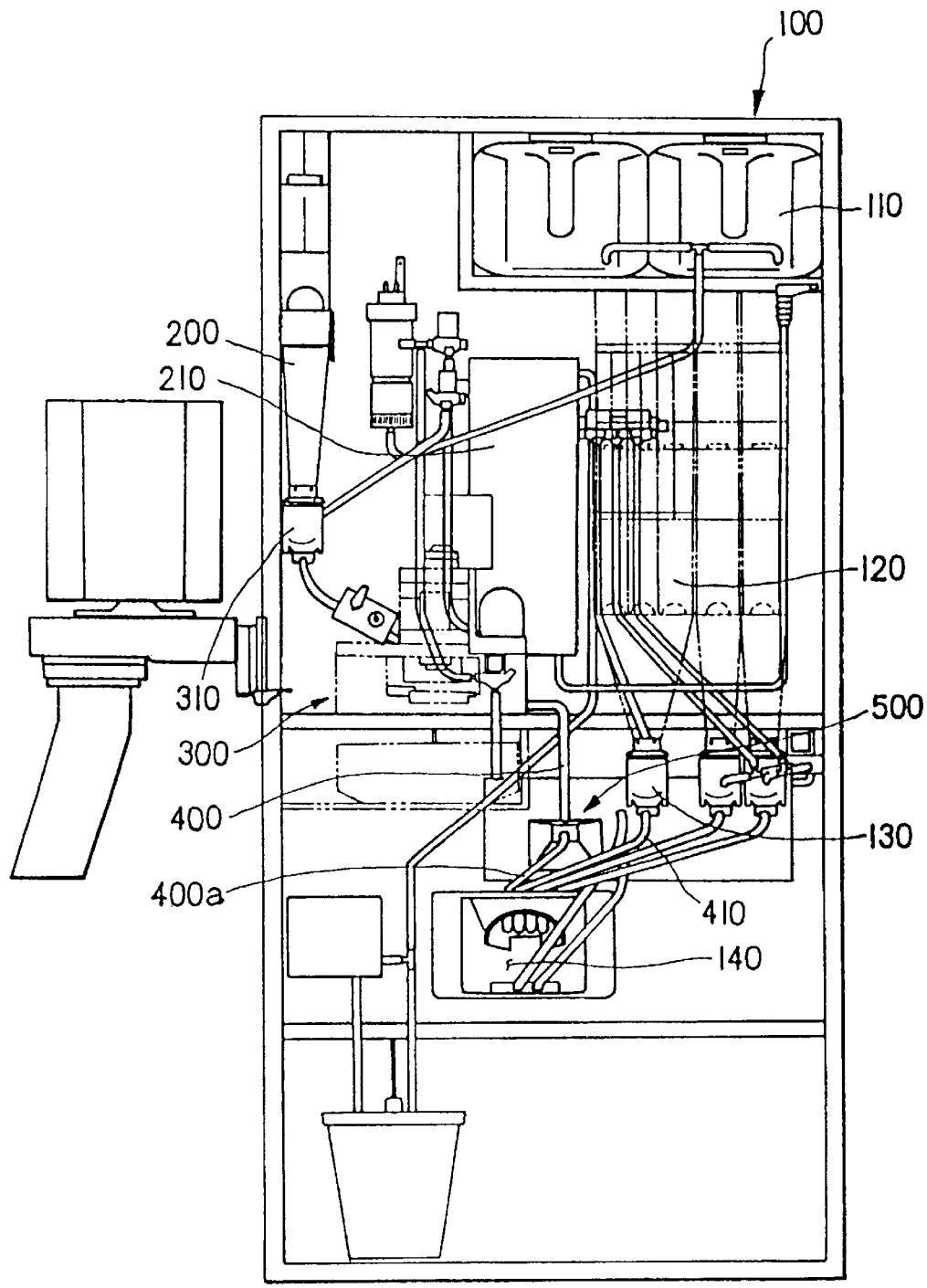
FIG. 3 schematically depicts a brewed coffee vending machine in accordance with the second preferred embodiment of the present invention.
Figure 4:
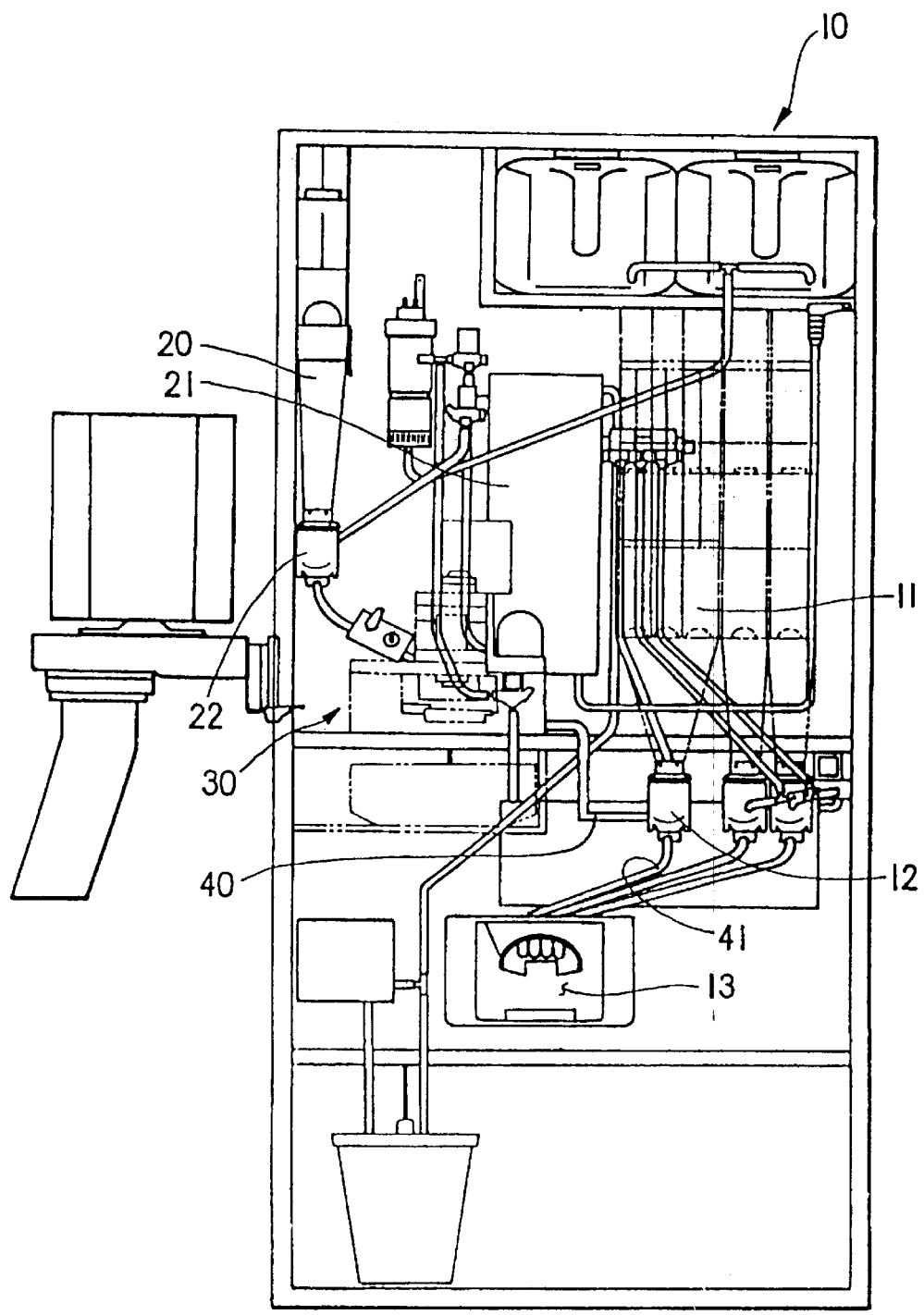
FIG. 4 schematically depicts the overall internal construction of a brewed coffee vending machine in accordance with a prior art.

The technical scope of the present invention is not limited to the above description. Alternatively, as the second embodiment of this invention, a drink supply conduit 410 can be provided between the mixing container 130 and cup dispenser 140 to introduce the mixture of the coffee, sugar and cream into the cup dispenser 140, as shown in FIG. 3. A coffee conduit 400 and a coffee supply conduit 400a are also included to direct the flow of the coffee from the extractor 300 to the cup dispenser 140, and a coffee reheating device 500 for reheating the coffee that has passed through the coffee conduit 400.

In other words, the coffee flows to the coffee reheating device 500 through the coffee conduit 400 to be reheated and then supplied to the cup dispenser 140 through the coffee supply conduit 400a. Flavoring materials and hot brewed coffee are mixed in the mixing container 130 and also supplied to the cup dispenser 140. Accordingly, the cup dispenser 140 dispenses the hot brewed coffee mixed with flavoring material to consumers.

As described above, the inventive brewed coffee vending machine includes the coffee reheating device which serves to reheat coffee extracted by the extractor, and mixes the reheated brewed coffee with sugar, cream, or both in the mixing container to thereby dispense hot brewed coffee to consumers through the cup dispenser. Accordingly, the inventive brewed coffee vending machine allows consumers to enjoy rich and steaming brewed coffee.

What is claimed is:

1. A brewed coffee vending machine comprising:

a ground coffee bean receptacle that holds ground coffee beans;

a hot water container that contains hot water;

mixing means for mixing a set amount of ground coffee beans from said ground coffee container with hot water from said hot water container;

extracting means for extracting, after receiving the mixture of ground coffee beans and hot water from said mixing means, extracts coffee by jetting pressurized air into the mixture; and a coffee reheating device that reheats the coffee extracted by said extracting means, wherein said coffee reheating device includes a heater embedded in a bottom surface of the coffee reheating device so that the heater is parallel to the bottom surface of said coffee reheating device.

2. A brewed coffee vending machine comprising:

a ground coffee bean receptacle that holds ground coffee beans;

a hot water container that contains hot water;

mixing means for mixing a set amount of ground coffee beans from said ground coffee container with hot water from said hot water from said hot water container;

extracting means for extracting, after receiving the mixture of around coffee beans and hot water from said mixing means, coffee by jetting pressurized air into the mixture; and a coffee reheating device that reheats the coffee extracted by said extracting means, wherein said coffee reheating device comprises:

a case in which an electric heating line is embedded;

a heating chamber disposed inside said case;

an intake nozzle disposed on one side of said case to direct the flow of the brewed coffee to said heating chamber; and an outlet disposed on another side of said case through which the brewed coffee, after being heated in said heating chamber, exits said coffee reheating device, wherein said intake nozzle is formed on said case's top surface so that the brewed coffee can drop into said heating chamber through said intake nozzle, and said heating chamber includes a distributing member on its bottom surface so as to evenly distribute the brewed coffee over the bottom surface of said heating chamber.

3. A brewed coffee vending machine as set forth in claim 2, wherein said distributing member is formed on the bottom of said heating chamber protruding upward so that the brewed coffee dropping into said heating chamber splashes against said distributing member, thus becoming evenly distributed within said heating chamber.

4. A brewed coffee vending machine as set forth in claim 2, wherein said coffee reheating device further comprises a protecting cover that encloses said case.

5. A brewed coffee vending machine as set forth in claim 4, wherein projections are formed between said protecting cover and said case so that an air gap is formed therebetween.

6. A brewed coffee vending machine as set forth in claim 5, wherein one end of each of the projections is welded to the outer surface of said case and the other end has a coupling hole, and the protecting cover is screwed to said case by the use of the coupling holes and holes formed on said protecting cover corresponding to the coupling holes of said projections.

7. A brewed coffee vending machine as set forth in claim 4, wherein said coffee reheating device further comprises a thermal insulation material for covering said protecting cover's outer surface.

* * * * *